United States Patent

Vogt-Birnbrich et al.

[11] Patent Number: 5,681,622
[45] Date of Patent: Oct. 28, 1997

[54] PROCESS FOR PRODUCING DECORATIVE MULTIPLE-LAYER COATINGS

[75] Inventors: Bettina Vogt-Birnbrich, Solingen; Hans-Peter Patzschke; Werner Lenhard, both of Wuppertal; Jurgen Döbert, Sprockhövel; Marcus Brunner, Wuppertal, all of Germany

[73] Assignee: Herberts Gesellschaft mit beschrankter Haftung, Germany

[21] Appl. No.: 564,343

[22] PCT Filed: Apr. 14, 1995

[86] PCT No.: PCT/EP95/01410
§ 371 Date: Feb. 13, 1996
§ 102(e) Date: Feb. 13, 1996

[87] PCT Pub. No.: WO95/28428
PCT Pub. Date: Oct. 26, 1995

[30] Foreign Application Priority Data

Apr. 19, 1994 [DE] Germany ............ 44 13 562.9

[51] Int. Cl.⁶ .................. B05D 1/36; C08L 83/00
[52] U.S. Cl. .................. 427/407.1; 427/388.4; 427/409; 524/588; 524/591; 524/839; 524/840
[58] Field of Search .................. 427/409, 407.1, 427/387, 388.4; 524/588, 591, 839, 840

[56] References Cited

U.S. PATENT DOCUMENTS

| | | | |
|---|---|---|---|
| 3,941,733 | 3/1976 | Chang | 260/29.2 |
| 4,108,814 | 8/1978 | Reiff et al. | 260/29.2 TN |
| 4,206,255 | 6/1980 | Wenzel et al. | 427/393.5 |
| 4,452,834 | 6/1984 | Nachtkamp et al. | 427/388.4 |
| 4,567,228 | 1/1986 | Gaa et al. | 524/588 |
| 4,652,466 | 3/1987 | Thoma et al. | 427/393.5 |
| 4,719,132 | 1/1988 | Porter, Jr. | 427/409 |
| 4,891,248 | 1/1990 | Kraus | 427/340 |
| 5,041,494 | 8/1991 | Franke et al. | 524/588 |
| 5,118,752 | 6/1992 | Chang et al. | 524/521 |
| 5,212,230 | 5/1993 | Tirpak et al. | 524/589 |
| 5,244,696 | 9/1993 | Hazan et al. | 427/402 |
| 5,266,361 | 11/1993 | Schwarte et al. | 427/407.1 |
| 5,281,468 | 1/1994 | Klier et al. | 427/409 |
| 5,322,714 | 6/1994 | Kato et al. | 427/409 |
| 5,326,812 | 7/1994 | Diener et al. | 524/507 |
| 5,372,875 | 12/1994 | Markusch et al. | 428/228 |
| 5,453,300 | 9/1995 | Diener et al. | 427/393.5 |
| 5,552,496 | 9/1996 | Vogt-Birnbrich et al. | 427/385.5 |

FOREIGN PATENT DOCUMENTS

| | | |
|---|---|---|
| 0 163 214 | 12/1985 | European Pat. Off. |
| 0 315 006 | 5/1989 | European Pat. Off. |
| WO 94/13723 | 6/1994 | WIPO |

*Primary Examiner*—Diana Dudash
*Attorney, Agent, or Firm*—Merchant, Gould, Smith, Edell, Welter & Schmidt

[57] ABSTRACT

A process and a coating medium for producing a decorative multilayer coating on a substrate, wherein a base lacquer coat is applied and is overpainted with a transparent lacquer coat, wherein an aqueous, self-crosslinking base lacquer is used, which contains, as a binder vehicle, an aqueous polyurethane resin dispersion based on a polyurethane resin having a number average molecular weight (Mn) of 2500 to 120,000, a content of 10 to 400 mmole of lateral and/or terminal hydroxyl and/or R'O groups bonded to silicon, where $R' = $ a $C_1$ to $C_8$ alkyl or $C(O)R'''$, and $R''' = $ a $C_1$ to $C_{10}$ alkyl, per 100 g solid resin, a hydroxyl number of 0 to 150, wherein hydroxyl groups bonded to silicon are not included in the calculation of the OH number, and a content of ionic groups, groups convertible into ionic groups and/or hydrophilic groups of 5 to 200 mEqu per 100 g solid resin.

16 Claims, No Drawings

PROCESS FOR PRODUCING DECORATIVE MULTIPLE-LAYER COATINGS

This invention relates to a process for producing decorative multilayer coatings of the aqueous base lacquer/clear lacquer type.

A multiplicity of aqueous base lacquers has become known. These lacquers contain aqueous polyurethane dispersions as binder vehicles, on account of the outstanding properties of the latter. The chains of the polyurethane resins forming the basis of the polyurethane dispersions can be extended in a wide variety of different ways.

Thus, for example, EP-A-0 089 497, EP-A-0 228 003, DE-A-36 28 124 and EP-A-0 512 524 describe aqueous base lacquers which contain, as binder vehicles, aqueous polyurethane dispersions which can be produced by extending the chains of isocyanate-functional prepolymers with a polyamine and/or a polyol.

DE-A-39 15 459 and DE-A-42 24 617 provide examples of aqueous base lacquers which contain, as binder vehicles, aqueous polyurethane dispersions which can be produced by extending the chains of isocyanate-functional prepolymers with water.

Examples of aqueous base lacquers based on aqueous polyurethane dispersions which can be produced by extending, with polyisocyanates, the chains of PU prepolymers which react with polyisocyanates and which contain active hydrogen, are given in DE-A-39 03 804 and DE-A-40 01 841.

Multilayer coatings which are produced using aqueous base lacquers which are formulated based on known polyurethane dispersions are in need of improvement as regards their resistance to water of condensation. If the known polyurethane dispersions are used as the sole binder vehicle in aqueous effect base lacquers, the formation of the effect is less favourable compared with aqueous effect base lacquers containing at least one additional co-binder vehicle.

EP-A-0 163 214 describes aqueous, self-crosslinking polyurethane dispersions which preferably contain lateral siliconate groups. The PU dispersions are prepared and stored under conditions such that reaction of the siliconate groups with each other is deliberately prevented. After application, the binder vehicles crosslink by condensation of the siliconate groups with the formation of siloxane bridges.

Other aqueous solutions or dispersions of polyurethanes containing reactive siliconate groups which are suitable for crosslinking are known from EP-A-0 315 006. The binder vehicles described therein are synthesised by the reaction of the isocyanate groups of isocyanate prepolymers with amino groups, i.e. chain extension is effected by way of amino groups. During the preparation of the binder vehicles a large amount of water is added, so that practically no siloxane bridges are formed, due to the law of mass action.

Both EP-A-0 163 214 and EP-A-0 315 006 make no mention of the fact that the binder vehicles which they describe are suitable for the production of aqueous base lacquers.

The object of the present invention is to provide a process for the production of decorative multilayer coatings of the aqueous base lacquer/clear lacquer type having an improved resistance to water of condensation, wherein aqueous polyurethane resins are used as binder vehicles in the aqueous base lacquers.

This object is achieved by means of the process for producing a decorative multilayer coating to which the invention firstly relates, wherein a colour- and/or effect-imparting lacquer coat of an aqueous base lacquer is applied to an optionally pre-coated substrate and is overpainted with a transparent lacquer coat, characterised in that a self-crosslinking coating medium is used as the aqueous base lacquer, which contains, as a binder vehicle, an aqueous polyurethane resin dispersion based on a polyurethane resin of linear or branched structure having a number average molecular weight (Mn) of 2500 to 120,000, a content of 10 to 400 mmole, preferably 20 to 300 mmole, most preferably 40 to 200 mmole, of lateral and/or terminal hydroxyl and/or R'O groups bonded to silicon, where $R'$=a $C_1$ to $C_8$ alkyl or $C(O)R'''$, and $R'''$=a $C_1$ to $C_{10}$ alkyl, per 100 g solid resin, a hydroxyl number of 0 to 150 mg KOH/g, preferably greater than 1 and less than 100 mg KOH/g, with respect to the solid resin, wherein hydroxyl groups bonded to silicon are not included in the calculation of the OH number, and a content of ionic groups, groups convertible into ionic groups and/or hydrophilic groups of 5 to 200 mEqu per 100 g solid resin.

The aqueous polyurethane resin used as a binder vehicle in the process according to the invention contains 5 to 200 mEqu (milliequivalents) of ionic groups, groups convertible into ionic groups and/or hydrophilic groups per 100 g solid resin.

If the groups which are convertible into ionic groups are acidic groups, or if the ionic groups are anionic, they are preferably present in an amount greater than 15 and less than 100 mEqu/100 g solid resin, most preferably greater than 18 and less than 60 mEqu/100 g solid resin.

If the groups which are convertible into ionic groups are basic groups, or if the ionic groups are cationic, they are preferably present in an amount greater than 30 and less than 150 mEqu/100 g solid resin, most preferably greater than 45 and less than 100 mEqu/100 g solid resin.

For hydrophilic groups the 5 to 200 mEqu refer to the lowest molecular weight constituents of such groups, and therefore for example to alkylene oxide units in pelyalkylene oxide groups, e.g. to ethylene oxide units in polyethylene oxide groups (units of this type are also termed repetition units).

Examples of ionic groups, groups convertible into ionic groups, and hydrophilic groups are given in the following description, which relates to the production of the aqueous polyurethane resin.

Production of the aqueous polyurethane resin containing lateral and/or terminal hydroxyl and/or R'O groups bonded to silicon may be effected, for example, by:

1) preparing, in an organic solvent or in the absence of solvents, a linear or branched, non-gelled PU propolymer, which contains ionic groups, groups capable of forming ions and/or hydrophilic groups as well as functional isocyanate groups, 2) reacting the free isocyanate groups of the PU prepolymer with one or more compounds of general formula

   (I)

where X=O, S, NH or $NR^{IV}$, preferably NH or $NR^{IV}$,

R=a bifunctional, trifunctional or tetrafunctional organic radical, preferably a bifunctional organic radical, with a molecular weight of 13 to 500, preferably an (ar)alkylene containing 1 to 12C atoms, most preferably an alkylene containing 1 to 12C atoms, $R'$=a $C_1$ to $C_8$ alkyl or $C(O)R'''$, preferably a $C_1$ to $C_4$ alkyl, R"=R'''=a $C_1$ to $C_{10}$ alkyl, wherein R" and R''' may be the same or different, $R^{IV}$=a $C_1$ to $C_8$ alkyl, a=1, 2 or 3, preferably 1, b=1, 2 or 3, preferably 2 or 3, c=0, 1 or 2, n=1 to 3, preferably 1 or 2, most preferably 1, wherein a plurality of radicals R', R" and R''' may be the same or different and wherein the sum of a plus b plus c is four, optionally in admixture with one or more alkanolamines containing $NH_2$ and/or NH groups with an OH functionality of at least 1, the quantitative proportions of the individual educts being selected so that the final polyurethane resin conforms to the specifications given above, and

3)

converting the optionally neutralised reaction product into an aqueous dispersion by the addition of water.

When converting the optionally neutralised reaction product into an aqueous dispersion, the water may be added to the resin. It is also possible to add the resin to the water. It is essential that within a short period of time an amount of water is added which is sufficient to prevent further reaction of the HOSi groups formed by hydrolysis. The addition of water is effected using a more than tenfold stoichiometric excess of the amount of water necessary for the hydrolysis of the R'OSi groups. At least a 50-fold stoichiometric excess is preferably added. The addition of water is most preferably effected as an amount such that at least half of the amount of water required for the production of the aqueous polyurethane dispersion is added all at once. By adding a sufficient amount of water, the formation of siloxane bridges by the condensation of the HOSi groups formed by hydrolysis, which condensation proceeds with the splitting-off of water, is substantially prevented, i.e. an aqueous dispersion of a polyurethane resin is obtained which is practically free from siloxane bridges and which contains R'OSi and/or HOSi groups in an amount sufficient for crosslinking.

Solvent which is optionally present may optionally be removed by distillation from the aqueous dispersion.

During the production of the aqueous polyurethane resin, the quantitative proportions of the individual educts are selected, and the reaction is conducted, so that the final polyurethane resin contains 10 to 400 mmole, preferably 20 to 300 mmole, most preferably 40 to 200 mmole, of lateral and/or terminal hydroxyl and/or R'O groups bonded to silicon, where R'=a $C_1$ to $C_8$ alkyl or C(O)R''', and R'''=a $C_1$ to $C_{10}$ alkyl, per 100 g solid resin, a number average molecular weight (Mn) of 2500 to 120,000, a hydroxyl number of 0 to 150 mg KOH/g, preferably greater than 1 and less than 100 mg KOH/g, with respect to the solid resin, wherein hydroxyl groups bonded to silicon are not included in the calculation of the OH number, and a content of ionic groups, groups convertible into ionic groups and/or hydrophilic groups of 5 to 200 mEqu per 100 g solid resin.

As an alternative to the sequential production process via NCO prepolymers described above, production of the R'OSi-functionalised polyurethane resin may also be effected by what is termed a single-stage process, i.e. process stages 1) and 2) described above can be conducted simultaneously, by reacting the adducts required there simultaneously with each other.

Regarding the selection of reactants, it must be ensured that the reactivity of the —XH functional groups is not impaired.

The production, in process stage 1) for example, of the linear or branched, non-gelled polyurethane prepolymer, which contains ionic groups, groups capable of forming ions and/or hydrophilic groups as well as functional isocyanate groups, which is hereinafter also termed the PU prepolymer containing NCO groups, may be effected, for example, by the reaction of one or more compounds containing at least two groups which react with isocyanate, particularly one or more polyols, preferably diols, with one or more organic polyisocyanates, preferably diisocyanates, and with one or more compounds which contain more than one, preferably two, groups which react with isocyanate and which contain at least one ionic group, group capable of forming ions and/or hydrophilic group.

For example, a polyurethane prepolymer which contains NCO groups and which can be used as a starting material for the production of the PU dispersion can be produced by the reaction in an anhydrous medium of a)

at least one linear or branched compound which contains at least two groups which react with isocyanate and which has an average molecular weight of 60 to 10,000, preferably 60 to 6000, b)

at least one organic polyisocyanate, particularly a diisocyanate, c)

at least one compound containing more than one group which reacts with isocyanate and at least one ionic group, group capable of forming ions and/or hydrophilic group, with a number average molecular weight (Mn) up to 10,000, preferably up to 2000, at an NCO/OH ratio of greater than 1 to 4:1.

The above-mentioned linear or branched compound of component a) is preferably at least one polyol based on one or more polyethers, polyesters, polyurethanes and/or polycarbonates, containing at least two OH groups in its molecule and having a number average molecular weight (Mn) of 600–10,000, preferably greater than 1000 and less than 5000, optionally with the use in conjunction of one or more at least difunctional low molecular weight alcohols and/or amines and/or amino alcohols which have a molecular weight less than 600, preferably less than 400.

All the production processes for polyurethane prepolymers containing NCO groups may be conducted as single- or multi-stage processes.

The PU prepolymer which contains isocyanate groups preferably has a content of urethane (—NHCOO—) groups and optionally of urea (—NHCONH) groups between 10 and 300 milliequivalents per 100 g solid resin.

Preparation of the aqueous polyurethane dispersion may be effected at each stage without organic solvents.

The compounds used as component a) for the production of the PU prepolymer containing NCO groups may, for example, be a linear or branched polyol component, e.g. diols. Examples of such polyols include polyols familiar to one skilled in the art which are used in the field of PU chemistry. Examples are described in DE-A42 28 510, for example. If a linear diol component is used as a starting material, proportions of polyols having a functionality of three or more may be added in order to effect branching of the polymer. The amount of these must be selected so that no gel formation occurs during the synthesis of the PU prepolymer containing NCO groups.

Low molecular weight compounds may be optionally used in conjunction in component a). These comprise alcohols and amines in particular. Examples include the compounds known from polyurethane chemistry which contain hydroxyl and/or amine groups which are at least difunctional in the sense of an isocyanate addition reaction and which have a molecular weight less than 600, preferably less than 300. Suitable compounds include both those which are difunctional compounds in the sense of an isocyanate addition reaction and compounds which are at least trifunctional in that sense, or any mixtures of compounds of this type.

Any organic polyisocyanates, such as diisocyanates for example, can be used as component b) for the production of the polyurethane dispersion. Aliphatic, cycloaliphatic, aromatic or araliphatic isocyanates may be used, as may sterically hindered isocyanates. Polyisocyanates, e.g. diisocyanates, containing ether or ester groups may also be used, for example. Examples of suitable diisocyanates include hexamethylene diisocyanate, 1-isocyanatomethyl-5-isocyanato-1,3,3,-trimethylcyclohexane, bis-(4-isocyanatocyclohexyl)-methane, bis-(4-isocyanato-phenyl)-methane and tetramethylxylylene diisocyanate.

Small proportions of isocyanates of higher functionality may optionally also be added, such as polyisocyanates of the biuret or isocyanurate type, for example, or products which are obtained by the reaction of an excess of diisocyanate with polyols.

Compounds which can be used as component c) preferably comprise low molecular weight, e.g. monomeric, compounds, for example, which contain more than one, preferably two, or at least two groups which react with isocyanate groups and at least one ionic group, group capable of forming ions and/or hydrophilic group. Anionic groups or groups which form anions are preferred. Suitable groups which react with isocyanate groups comprise hydroxyl groups and primary and secondary amino groups in particular. Examples of suitable acidic groups which are capable of forming anions include carboxyl, phosphoric acid and sulphonic acid groups. Examples of basic groups which can be converted into cations include primary, secondary and tertiary amino groups or onium groups such as quaternary ammonium, phosphonium and/or tertiary sulphonium groups. The anionic groups which are preferably introduced are carboxyl groups. These may be introduced, for example, by the use of hydroxyalkane carboxylic acids of the following general formula as component c):

$$(HO)_xQ(COOH)_y$$

where
Q represents a linear or branched hydrocarbon radical containing 1 to 12C atoms, and x and y each represent 1 to 3. Examples thereof include citric acid and tartaric acid. Carboxylic acids such as these are preferred in which x=2 and y=1. Examples thereof are described in U.S. Pat. No. 3 412 054. One preferred group of dihydroxyalkane acids is that comprising alpha,alpha-dimethylolalkane acids of general formula $$Q'-\underset{\underset{CH_2OH}{|}}{\overset{\overset{CH_2OH}{|}}{C}}-COOH$$

where Q' is hydrogen or a $C_1-C_8$ alkyl. The compounds which are the most preferred are alpha,alpha-dimethylolpropionic acid and alpha,alpha-dimethylolbutyric acid.

Other examples of dihydroxyalkane acids which can be used include dihydroxypropionic acid, dimethylolacetic acid, dihydroxysuccinic acid and dihydroxybenzoic acid.

Examples of acids which contain amino groups and which can be used include alpha,alpha-diaminovaleric acid, 3,4-diaminobenzoic acid, 2,4-diaminotoluenesulphonic acid-(5) and 4,4-diamino-di-phenyl ether sulphonic acid.

Acidic polyesters such as those described in DE-A-39 03 804 may also be used as component c). These polyesters preferably have a molecular weight of 300 to 2000, a hydroxyl number of 56 to 374 and an acid number of 28 to 187.

Polyurethane polyols which contain ionic groups or groups convertible into ionic groups can also be used as component c).

Component c) may also comprise non-ionic hydrophilic polyols. Examples of these include compounds which contain polyether chains with incorporated ethylene oxide units. These are compounds containing one or two hydrogen atoms which are capable of reacting with isocyanates, and which have polyether chains containing ethylene oxide in their side chain, for example. Examples of these include compounds of general formulae

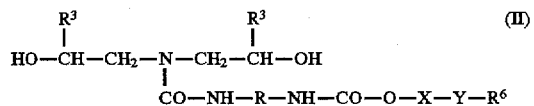

$$HO-X-Y-R^6 \quad (III)$$

$$HNR^3-X-Y-R^6 \quad (IV)$$

where
R=the radical which results from an isocyanate component, e.g. from the isocyanates cited above,
$R^3$=H, or a linear or branched $C_1-C_8$ alkyl,
$R^6$=a $C_1-C_{12}$ alkyl, preferably an unsubstituted $C_1-C_4$ alkyl,
X=a radical which is obtained by removing the terminal oxygen atom from a polyalkylene oxide chain containing 5 to 90, preferably 20 to 70, chain members, wherein at least 40%, preferably 65%, of the chain members consist of ethylene oxide units, and which chain members, apart from ethylene oxide units, may also comprise propylene oxide, butylene oxide or styrene oxide units, for example, and Y=—O— or —$NR^6$—, where $R^6$ is as defined above.

Compounds II to IV may be prepared analogously to U.S. Pat. Nos. 3 920 598, 3 905 929, 4 190 566 or 4 237 264, for example.

The anionic, cationic or non-ionic groups of component c) serve to stabilise the aqueous dispersion. Ionic and non-ionic groups may be used jointly. Stabilisation by ionic groups, most preferably by anionic groups, is preferred.

Dihydroxycarboxylic acids are preferred for the production of an anionic urethane prepolymer. Dimethylolpropionic acid is particularly preferred. Component c) is preferably used in an amount of about 0.4% by weight to about 7.5% by weight, most preferably about 0.8 to 5.0% by weight (calculated as the carboxyl group COOH) with respect to the urethane prepolymer (solid resin) used. If the amount of carboxyl group is less than about 0.4% by weight it is difficult to produce a stable emulsion. On the other hand, if the amount exceeds 7.5% by weight this enhances the hydrophilic properties, which makes the emulsion highly viscous and reduces the water-resistance of the coating.

The amounts of a), b) and c) are selected so that a reaction product containing lateral and/or terminal NCO groups is formed during the reaction, i.e. an excess of polyisocyanate is employed. An NCO to OH ratio greater than 1 to 4:1 may be employed, with the range from 1.1 to 2:1 being preferred, and the range from 1.1 to 1.7:1 being particularly preferred. The polyurethanes preferably contain less than 280 milliequivalents of —NHCOO— per 100 g solid resin. The reaction product may have a branched structure; in general, however, it preferably has a linear structure with terminal NCO groups.

The polyurethane prepolymer containing NCO groups is reacted with one or more compounds of general formula

$$((H\text{---}X\text{---})_n R)_a Si(OR')_b (R'')_c \qquad (I)$$

where $X=O$, $S$, $NH$ or $NR^{IV}$, preferably $NH$ or $NR^{IV}$,
R=a bifunctional, trifunctional or tetrafunctional, preferably a bifunctional, organic radical with a molecular weight of 13 to 500, preferably an (ar)alkylene containing 1 to 12C atoms, most preferably an alkylene containing 1 to 12C atoms,
R'=a $C_1$ to $C_8$ alkyl or $C(O)R''$, preferably a $C_1$ to $C_4$ alkyl,
R''=a $C_1$ to $C_{10}$ alkyl,
$R^{IV}$=a $C_1$ to $C_8$ alkyl,
a=1,2 or 3, preferably 1,
b=1,2 or 3, preferably 2 or 3,
c=0, 1 or 2,
n=1 to 3, preferably 1 or 2, most preferably 1,
and wherein the sum of a plus b plus c is four, optionally in admixture with one or more alkanolamines containing $NH_2$ and/or NH groups with an OH functionality of at least 1, to form a polyurethane resin which contains ionic groups, groups capable of forming ions and/or hydrophilic groups and lateral and/or terminal R'O groups bonded to silicon.

Compounds of general formula (I) are silane derivatives comprising groups of the (H—X—)$_n$R type which contain active hydrogen and which are capable of undergoing addition in relation to isocyanate groups. Amine groups are preferred as the functional groups HX— containing active hydrogen; n has values of 1 to 3, and n preferably assumes the value 1. The radical R is a bifunctional to tetrafunctional organic radical, preferably a bifunctional organic radical, which may contain chemically inert groups or substituents, and which has a molecular weight of 13 to 500. The radical R is preferably a bifunctional (ar)alkylene radical containing 1 to 12C atoms. An alkylene radical containing 1 to 12C atoms is particularly preferred as the radical R.

The silane derivative of general formula (I) also contains 1 to 3, preferably 2 or 3, R'O groups bonded to silicon, wherein R' preferably represents a $C_1$ to $C_8$ alkyl.

Some preferred examples of compounds (I) include beta-amino-ethyltriethoxysilane, gamma-aminopropyltriethoxysilane, gamma-aminopropyltrimethoxysilane, gamma-aminopropylethyldiethoxysilane, gamma-aminopropylphenyldiethoxysilane, gamma-aminopropyltrimethoxysilane, delta-amino-butyltriethoxysilane, delta-amino-butylethyl-diethoxysilane, N-(2-aminoethyl-3-aminopropyl)-trimethoxysilane, N-(2-aminoethyl-3-aminopropyl-tris(2-ethylhexoxy)silane, 6-(aminohexylaminopropyl)-trimethoxysilane, and N-aminomethyl-3-aminopropyl-methyl-dimethoxysilane.

The reaction of the NCO-functional polyurethane prepolymer to form the R'OSi-functionalised polyurethane resin is effected with complete consumption of the HX groups of compounds I. Isocyanate groups and HX groups are preferably reacted with each other stoichiometrically in a 1:1 ratio. However, it is also possible to conduct the reaction with an excess of isocyanate groups. The remaining isocyanate groups can be utilised for further synthesis reactions, by reaction with water, hydrazine, carboxylic acid hydrazides, polyols or amines, for example.

The polyurethane resin containing lateral and/or terminal R'OSi groups bonded to silicon may contain hydroxyl groups. If this is desired, the polyurethane prepolymer containing NCO groups is reacted, during the production of the R'OSi-functionalised polyurethane resin, with at least one compound of general formula I and with at least one alkanolamine which has an OH functionality of at least 1 and which contains at least one $NH_2$ and/or NH group. The reaction is effected with complete consumption of the HX groups of compounds I and of the NH groups of the alkanolamine. The isocyanate groups of the NCO-functional PU prepolymer are preferably reacted in the stoichiometric ratio with the I–IX groups of I and the NH groups of the alkanolamine. In this connection, the alkanolamine and compound I may be reacted in admixture or successively with the NCO-functional polyurethane prepolymer.

The alkanolamines which have an OH functionality of at least 1 and which contain $NH_2$ and/or NH groups are compounds which can serve as suppliers of hydroxyl groups in the polyurethane resin dispersion. The NH or $NH_2$ groups of the alkanolamines have a reactivity towards the isocyanate groups of the NCO-functional PU prepolymer which is considerably higher than their reactivity towards the OH groups of the latter, i.e the NH groups react preferentially with the isocyanate groups with the formation of urea.

Examples of suitable alkanolamines which have an OH functionality of at least 1 include monoalkanolamines and dialkanolamines, e.g. diethanolamine, N-methyl ethanolamine, diisopropanolamine, N-ethyl isopropanolamine, monoisopropanolamine, ethanolamine, 2,2-aminoethoxyethanol, monoethyl ethanolamine, butyl ethanolamine, cyclohexyl ethanolamine, 3-aminopropanol, and 2-aminobutanol-1.

Instead of alkanolamines containing $NH_2$ and/or NH groups, other monofunctional compounds which react with NCO groups may also be used, for example monoamines and/or monoalcohols containing C-6 to C-30 alkyl radicals. Fatty amines and/or fatty alcohols containing more than 12C atoms are preferred in this respect. In this case, polyurethane resins containing R'O groups bonded to silicon are obtained which contain no hydroxyl groups. Monoamines and/or monoalcohols may also of course be used in admixture with alkanolamines containing $NH_2$ and/or NH groups. In this manner, the OH number of the resulting polyurethane resin containing lateral and/or terminal R'O groups bonded to silicon may be arbitrarily adjusted within the range from 0 to 100.

An essential step in the production of the aqueous polyurethane dispersion based on the polyurethane resin containing lateral and/or terminal R'O groups bonded to silicon is that an amount of water is added within a short period of time to the R'OSi-functionalised PU prepolymer which optionally contains hydroxyl groups, which amount of water is sufficient to prevent further reaction of the HOSi groups formed by hydrolysis. The water is added using a more than ten-fold stoichiometric excess of the amount of water necessary for the hydrolysis of the R'OSi groups. At least a 50-fold stoichiometric excess is preferably used. The water is most preferably added in an amount such that at least half the amount of water required for the production of the aqueous polyurethane dispersion is added all at once. By adding a sufficient amount of water, the formation of siloxane bridges by the condensation of the HOSi groups formed by hydrolysis, which condensation proceeds with the splitting off of water, is substantially prevented, i.e. an aqueous dispersion of a polyurethane resin is obtained which is practically free from siloxane bridges and which contains R'OSi and/or HOSi groups in an amount sufficient for crosslinking.

The polyurethane resin contains ionic groups, groups capable of forming ions, and/or hydrophilic groups. If the polyurethane resin contains groups capable of forming ions, these are wholly or partially converted into the corresponding salts with a suitable compound, e.g. a neutralising agent. This can be effected in all stages of the synthesis described above, wherein it must be ensured that the compounds used for salt formation are selected so that they behave as chemically inert entities during the synthesis. The compounds used for salt formation, such as neutralising agents for example, are preferably added jointly with the water.

The preferred groups which are capable of forming ions are those which are capable of forming anions. Examples of groups such as these have been described above in relation to the synthesis of the PU prepolymer containing NCO groups. A base, e.g. an amine, preferably a tertiary amine, is then employed for the conversion into anions. Examples of suitable tertiary amines include trialkylamines such as trimethylamine, triethylamine, triisopropylamine, tri-n-propylamine and tri-n-butylamine; N-alkylmorpholines such as N-methylmorpholine and N-ethylmorpholine; N-dialkylalkanolamines such as N-dimethylethanolamine, N-diethylethanolamine and N-dimethylisopropanolamine, and mixtures of at least two of these compounds.

If the polyurethane resin contains cation-forming groups, one or more acids are preferably used for ion formation. Examples of suitable acids include phosphoric acid or acidic phosphoric acid esters, or organic carboxylic acids such as formic acid, acetic acid, propionic acid or acrylic acid, hydroxycarboxylic acids such as lactic acid, dimethylolpropionic acid or citric acid, or dicarboxylic acids such as malonic acid, glutaric acid or oxalic acid. Mixtures of these acids may also be used. A quaternarisation reaction with alkylating agents is also possible, however, such as a reaction with alkyl halides or epoxides, for example.

The reaction of the components used for the synthesis of the NCO-functional PU prepolymer, and also the further reaction to form the R'OSi-functionalised polyurethane resin, are conducted in an anhydrous medium, for example at temperatures between 20° and 140° C., preferably between 40° and 100° C. The reactions may be conducted free from solvents, or suitable organic solvents which are familiar to one skilled in the art for polyurethane synthesis may be employed. Water-miscible or water-immiscible solvents may be used as the solvents. It is generally advantageous to employ those solvents which can be removed at any stage of production of the PU dispersion (for example after the final production of the latter), by distillation, optionally under reduced pressure for example.

Examples of suitable solvents include ketones e.g. acetone, methyl ethyl ketone or methyl isobutyl ketone; N-alkylpyrrolidones, such as N-methylpyrrolidone, for example; ethers, such as diethylene glycol dimethyl ether or dipropylene glycol dimethyl ether, for example, and also cyclic urea derivatives such as 1,3-di-methyl-3,4,5,6-tetrahydro-2(1H)-pyrimidinone.

The polyurethane resin which is solvent-free or which is present in organic solution in converted into an aqueous phase by adding sufficient amounts of water. A finely divided polyurethane dispersion is obtained, with an average particle size greater than 10 nm and less than 2000 µm, preferably greater than 50 nm and less than 500 nm. The particle size distribution may be monomodal or bimodal, preferably monomodal.

In general, it is not necessary conjointly to use emulsifiers in order to convert the polyurethane resins used into aqueous dispersions. However, this does not rule out the possible use of ionic and non-ionic types of emulsifiers in order to facilitate emulsification and optionally to reduce the number of ionisable groups.

During the production of the polyurethane dispersion, the educts are caused to react with one another in amounts such that the binder vehicle qualities which are desirable to one skilled in the art are obtained, e.g. dispersibility in water, viscosity behaviour, film-forming properties, stability on storage. Properties such as the hardness and resistance to weathering of coatings obtained from the dispersions, for example, can also be influenced by the choice of the type and amount of the components. The choice of the type and amount of the components can easily be determined by one skilled in the art with the aid of the teaching given here, optionally with the aid of routine tests. Overall, the quantitative proportions of the individual educts are preferably selected and the reaction is preferably conducted so that the polyurethane resin forming the basis of the polyurethane dispersion has a number average molecular weight (Mn) of 2500 to 120,000, a content of 10 to 400 mmole, preferably 20 to 300 mmole, most preferably 40 to 200 mmole, of lateral and/or terminal hydroxyl and/or R'O groups bonded to silicon, where $R'$=a $C_1$ to $C_8$ alkyl or $C(O)R'''$, and $R'''$=a $C_1$ to $C_{10}$ alkyl, per 100 g solid resin, a hydroxyl number of 0 to 150 mg KOH/g, preferably greater than 1 and less than 100 mg KOH/g, with respect to the solid resin, wherein hydroxyl groups bonded to silicon are not included in the calculation of the OH number, and a content of ionic groups, groups convertible into ionic groups and/or hydrophilic groups of 5 to 200 mEqu per 100 g solid resin.

The production of the aqueous PU dispersion based on the polyurethane resin containing lateral and/or terminal hydroxyl and/or R'O groups bonded to silicon may be effected by known methods. For example, it is possible to place the neutralised resins in a vessel and to mix them with water with good dispersion. The aqueous phases which optionally contains neutralising agents may also be placed in a vessel and the resin may be incorporated with stirring. A continuous mode of operation is also possible, e.g. the resin, water and neutralising agent may be homogeneously mixed together simultaneously in known processing units, e.g. a rotor-stator mixer.

The pH of the resulting polyurethane dispersion can be adjusted to a value between 5 and 10, for example. A finely-divided, opaque to milky, turbid aqueous dispersion is obtained from the components.

The anionic PU dispersions which are preferably used have an acid number of 5 to 90 (with respect to the solids), preferably greater than 10 and less than 50. The solids content is between 25 and 65% by weight, preferably greater than 35 and less than 60% by weight. The number average molecular weight (Mn) of the polyurethane resins contained in the PU dispersions is 2500 to 120,000 for example, the lower limit preferably being 4000, most preferably 10,000, and the upper limit being up to 50,000.

Solvents which are optionally contained in the polyurethane dispersions may be removed, if desired, by distillation. This may be effected under reduced pressure.

The aqueous base lacquers produced from the PU dispersions are self-crosslinking. The PU resins forming the basis of the PU dispersions have hydroxyl numbers between 0 and 100, preferably between 0 and 60 mg KOH/g, wherein hydroxyl groups bonded to silicon are not included in the calculation of the OH number. If the self-crosslinking aqueous base lacquers used in the process according to the invention are to be open to external crosslinking in addition, the hydroxyl number of the polyurethane resins is preferably within the upper range of values.

Pigments, additional binder vehicles, additives and optionally small amounts of solvents may be added to the PU dispersion for the production of the self-crosslinking aqueous base lacquers, for example.

Apart from the self-crosslinking polyurethane resin dispersion, the aqueous base lacquers may contain one or more additional, different binder vehicles. This may be advantageous in order to obtain synergistic effects, for example. Examples of additional binder vehicles include the customary, film-forming, water-soluble or water-thinnable resins familiar to one skilled in the art, such as water-thinnable polyester resins, water-thinnable polyacrylate resins and/or other types of water-thinnable polyurethane resins. These may be reactive or non-functional resins. The amount of added resins may be 0 to 75% by weight, preferably 0 to 50% by weight, of the total resin solids. 0 to 30% by weight is particularly preferred. In this connection, the term "resin solids" means the sum of all the binder vehicles, excluding the content of crosslinking agent which is optionally present for external crosslinking which is possibly desired in addition.

The specifications and quantitative proportions of additional binder vehicles are selected so that a mixture is preferably obtained which on average has a content of ionic groups, groups convertible into ionic groups and/or hydrophilic groups of 5 to 200 mEqu per 100 g polyurethane resin. Anionic groups are preferred.

Examples of water-thinnable polyesters which can be used include those containing free carboxyl groups, i.e. polyesters with a high acid number. In principle there are two known methods of incorporating the requisite carboxyl groups into the resin system. The first route consists of terminating the esterification when the desired acid number has been reached. When employing this method, the incorporation of specifically hindered carboxyl groups, by condensation with dimethylolpropionic acid for example, is preferred. After neutralisation with bases, the polyesters which are obtained in this manner are soluble in water. The second possibility consists of forming partial esters of di- or polycarboxylic acids with polyesters which are rich in hydroxyl groups and which have a low acid number. Anhydrides of dicarboxylic acids are usually utilised for this reaction; they are reacted with the hydroxyl component under mild conditions with the formation of a free carboxyl group.

The water-thinnable polyacrylate resins which can be used may also contain free carboxyl groups, just like the polyester resins described above. Examples of these polyacrylate resins include acrylic or methacrylic copolymers, and the carboxyl groups originate from the content of acrylic or methacrylic acid.

Additional polyurethane dispersions should be understood to mean those which are described in DE-A-36 28 125, for example. These are anionically stabilised PU dispersions which can be produced by the reaction of polyols, diisocyanates, ionic compounds and chain extenders with amines. In addition, PU dispersions stabilised by non-ionic, hydrophilic groups my also be added to the self-crosslinking aqueous base lacquers used in the press according to the invention.

The water-thinnable polyesters or polyurethane resins may also be acrylated or grafted in dispersions by suitable polymerisation processes. Examples of acrylated polyurethane dispersions which can be used are described in DE-A-41 22 265.

Another group of aqueous dispersions which may be added to the aqueous base lacquers used in the process according to the invention are the dispersions described in DE-A-36 28 124, which are based on condensation polymers containing ionic epoxide groups, and which are reacted with copolymerisable, unsaturated monomers.

When adding further binder vehicles it is self-evident that additional ionically stabilised resins and dispersions can only be used together with ionic dispersions with the same type of charge, so as not to have a negative effect on the stability.

If additional, external crosslinking is desired, various crosslinking agents, e.g. formaldehyde condensation resins such as phenol-formaldehyde condensation resins and amine-formaldehyde condensation resins for example, and also blocked polyisocyanates, may be used to produce the intrinsically self-crosslinking aqueous base lacquers which can be used in the process according to the invention. The crosslinking agents may be used individually or in admixture. The mixture ratio of crosslinking agent to polyurethane resin is preferably 10:90 to 40:60, most preferably 20:80 to 30:70, with respect to the weight of solids in each case. If additional binder vehicles are used apart from the polyurethane resin dispersion according to the invention, the above mixture ratios are preferably based on the total resin solids.

Examples of amine resins which are suitable as crosslinking agents include alkylated condensates which are produced by the reaction of aminotriazines and amidotriazines with aldehydes. Amines or compounds containing amino groups such as melamine, guanamine, acetoguanamine, benzoguanamine, dicyandiamide or urea are condensed with aldehydes, particularly formaldehyde, by known industrial methods in the presence of alcohols such as methanol, ethanol, propanol, butanol or hexanol. The reactivity of amine resins of this type is determined by the degree of condensation, the ratio of the amine or amide components to formaldehyde and by the type of alcohol used for etherification. Examples of resins of this type and their production are described in "Houben-Weyl, Methoden der organischen Chemie ["*Methods of Organic Chemistry*"] 1963, page 357. These products are in common use commercially.

Blocked polyisocyanates may also be used as crosslinking agents. Any polyisocyanates may be used for the invention in which the isocyanate groups have been reacted with a compound such that the blocked polyisocyanate formed is resistant to hydroxyl groups and water at room temperature, but reacts at elevated temperatures, in the range from about 90° to about 250° C. for example. Any organic polyisocyanates which are suitable for crosslinking may be used for the production of the blocked polyisocyanates. Isocyanates are preferred which contain about 3 to about 36 carbon atoms, particularly about 8 to 15 carbon atoms. The diisocyanates cited above as component b) are examples of suitable diisocyanates.

Polyisocyanates of higher isocyanate functionality are preferred, as cited above under b). Examples thereof include tris-(4-isocyanatophenyl)-methane, 1,3,5-triisocyanatobenzene, 2,4,6-triisocyanatotoluene, 1,3,5-tris (6-isocyanatohexane)-biuret, bis-(2,5-diisocyanato-4-methyl-phenyl)-methane and polymeric polyisocyanates such as dimers and trimers of diisocyanatotoluene. Mixtures of polyisocyanates may also be used.

The organic polyisocyanates which may be used as crosslinking agents in the aqueous base lacquers may also be prepolymers, which may be derived from a polyol, for example. For this purpose, polyols are reacted in the usual manner with an excess of polyisocyanates, whereupon prepolymers containing terminal isocyanate groups are formed. The blocked polyisocyanates which can be used as crosslinking agents may be blocked with the usual volatile monovalent blocking agents which are used in lacquer chemistry. Examples of these include various alcohols, oximes, phenols, NH-functional nitrogen heterocycles such as pyrazole derivatives or triazole derivatives, amines, beta-keto compounds and phthalimide. The polyisocyanates may be blocked with the same or different blocking agents in one molecule. Mixtures of different blocked polyisocyanates may also be used as crosslinking agents, as may polyisocyanates which are blocked differently intramolecularly.

In addition, the self-crosslinking aqueous base lacquers may contain polymer microparticles known to one skilled in the art. Crosslinked or uncrosslinked microparticles may be used. Examples of polymer microparticles such as these are described in EP-A-0 038 127 and EP-A-0 234 362.

The self-crosslinking aqueous base lacquers used in the process according to the invention may also contain industrial lacquer additives, for example media which affect the rheology, such as highly dispersed hydrated silica, inorganic layer silicates or polymeric urea compounds. Examples of substances which act as thickeners also include water-soluble cellulose ethers such as hydroxyethyl cellulose, methyl cellulose or carboxymethyl cellulose, as well as synthetic polymers containing ionic groups or groups with an associative action such as polyvinyl alcohol, poly(meth)acrylamide, poly(meth)acrylic acid, polyvinyl pyrrolidone, styrene-maleic anhydride or ethylene-maleic anhydride copolymers and derivatives thereof, and also hydrophobically modified ethoxylated polyurethanes or polyacrylates. In addition, anti-settling agents, flow enhancers, light stabilisers, antifoaming agents such as compounds containing silicones for example, surface-active agents and bonding agents can also be used. The term "surface-active agents" should also be understood to mean known paste resins which can be used to promote better dispersion and comminution of the pigments. Catalysts may optionally be used to speed up hardening; however, it is also possible to employ thermal energy for hardening without the use of a catalyst.

The usual industrial lacquer solvents are suitable as solvents present in small amounts. These may stem from the production of the binder vehicle or may be added separately. Examples of solvents such as these include mono- or polyhydric alcohols, e.g. propanol, butanol or hexanol; glycol ethers or esters, e.g. diethylene glycol dialkyl ethers, dipropylene glycol dialkyl ethers, each containing a $C_{1-6}$ alkyl, ethoxypropanol or butyl glycol; glycols e.g. ethylene glycol, propylene glycol and oligomers thereof; N-methylpyrrolidone, as well as ketones such as methyl ethyl ketone, acetone or cyclohexanone; aromatic or aliphatic hydrocarbons, e.g. toluene or xylene, or $C_6$–$C_{12}$ linear or branched aliphatic hydrocarbons.

The self-crosslinking aqueous base lacquers may contain one or more inorganic and/or organic colour- or effect-imparting pigments and optionally at least one filler in addition.

Examples of effect-imparting pigments include metal pigments, e.g. those comprising aluminium, copper or other metals; interference pigments, such as metal pigments coated with metal oxides, e.g. titania-coated aluminium, coated mica, such as titania-coated mica, for example, and graphite effect pigments. Examples of colour-imparting pigments and fillers include titania, micronised titania, iron oxide pigments, carbon black, silica, barium sulphate, micronised mica, french chalk, kaolin, chalk, azo pigments, phthalocyanine pigments, quinacridone pigments, pyrrolopyrrole pigments and perylene pigments.

The effect pigments are generally employed in the form of a commercially available aqueous or non-aqueous paste, are optionally mixed with organic solvents and additives, which are preferably water-thinnable, and thereafter mixed with the aqueous binder vehicle with shearing. Effect pigments in powder form may first be processed to form a paste with water-thinnable organic solvents and additives. In this respect it must be ensured that lamellar effect pigments are not mechanically damaged during mixing.

Coloured pigments and/or fillers may be made into a paste in a portion of the aqueous binder vehicle, for example. Paste formation may also preferably be effected in a special water-thinnable paste resin. An example of a paste resin based on polyurethane which is preferably used in a aqueous base lacquer according to the invention is given in DE-A40 00 889. Paste formation may be effected in the customary processing units known to one skilled in the art. Thereafter, paste formation is carried out to completion with the residual proportion of the aqueous binder vehicle or of the aqueous paste resin to produce the finished coloured pigment.

If paste resins are present in the coating medium, these are added to the binder vehicle plus the crosslinking agent which is optionally present for the calculation of the resin solids.

If the aqueous base lacquer is formulated based on the preferred anionically stabilised, self-crosslinking polyurethane resin containing lateral and/or terminal R'OSi and/or HOSi groups, it contains bases as neutralising agents. Examples include ammonia or organic amines such as triethylamine or N-methyl-morpholine, and amino alcohols such as dimethyl isopropanolamine, dimethyl ethanolamine or 2-amino-2-methylpropanol-1.

The self-crosslinking aqueous base lacquers may have a solids content of 10–50% by weight, for example. For effect base lacquers this is preferably 15–30% by weight, for example, and for single-colour base lacquers it is preferably higher, for example 20–45% by weight. The ratio of pigment to binder vehicle plus the optional crosslinking agents plus the optional paste resin in the aqueous base lacquer may be between 0.03:1 and 3:1, for example. For effect base lacquers this is preferably 0.06:1 to 0.6:1, for example, and for single-colour base lacquers it is preferably higher, for example 0.06:1 to 2.5:1, based on the weight of solids in each case.

The solvent content of the aqueous base lacquers is preferably less than 20% by weight, more preferably less than 15% by weight, most preferably less than 10% by weight.

The self-crosslinking aqueous base lacquers may be applied by the usual methods. They are preferably applied by spraying at a dry coat thickness of 8 to 50 μm. For effect base lacquers the dry coat thickness is preferably 10 to 25/xm, for example, and for single-colour base lacquers it is preferably greater, for example 10 to 40 μm. Application is preferably effected by the wet-into-wet process, i.e. after an air ventilation phase, e.g. at 20°–80° C, the aqueous base lacquer coats are overpainted with a customary clear lacquer at a dry coat thickness of preferably 30–60 μm and crosslinked jointly with the latter, with condensation of the HOSi groups to form siloxane bridges, at temperatures of 20° to 140° C., for example. The drying conditions for the covering lacquer coat (base lacquer and clear lacquer) depend on the clear lacquer system used. They may involve temperatures of 20° to 150° C, for example. Temperatures of 20° to 80° C. are preferred for repair purposes, for example. Temperatures above 100° C., for example above 110° C., are preferred for mass production coating purposes.

In principle, all known clear lacquers or transparent pigmented coating media are suitable as the clear lacquer. 1- or 2-component lacquers containing solvents, water-thinnable clear lacquers, clear coating powders or radiation-hardenable clear lacquers may all be used in this respect.

Multilayer coatings produced by the process according to the invention may be applied to very different types of substrates. The latter are generally metallic or plastics substrates. They are frequently pre-coated, i.e. plastics substrates may be provided with a plastic primer coat for example. Metallic substrates generally have an electrophoretically deposited primer coat and optionally one or more further lacquer coats in addition, such as a filler coat (primer-surfacer) for example. These coats are generally hardened. The aqueous base lacquer may, however, be applied wet-into-wet to uncrosslinked filler coats, as described in EP-A-0 238 037 for example. In this case the base lacquer is generally stoved jointly with the filler coat before the application of a clear lacquer covering coat.

It is also possible to apply the aqueous base lacquer directly, without additional intermediate coats, to a stoved or un-stoved electrodip lacquer coat, as is also possible for other known solvent-based or aqueous base lacquers.

The multilayer coatings obtained from the application of the process according to the invention fulfil the requirements which are currently customary for motor vehicle paintwork. The process according to the invention is thus suitable for vehicle paintwork and vehicle repair paintwork. It can also be used in other areas, e.g. plastics coating, particularly for the coating of vehicle components.

The multilayer coating produced by the process according to the invention has a good surface. The adhesion between the coats and the base lacquer coat is good and also exhibits no de-bonding defects, even when subjected to a humidity cabinet environment. The invention is particularly suitable for use in automobile paintwork (mass production and repair paintwork).

The multilayer coatings produced by the process according to the invention, using the self-crosslinking aqueous base lacquers which contain, as binder vehicles, polyurethane resins comprising lateral and/or terminal R'OSi and/or HOSi groups, are characterised by their outstanding resistance to water of condensation.

PREPARATION EXAMPLE 1

339 g of a polyester of adipic acid, hexanediol and isophthalic acid (OH number: 104) and 19 g dimethylolpropionic acid were dissolved in 160 g N-methylpyrrolidone and heated to 40° C. Thereafter, 125 g isophorone diisocyanate were added in a manner such that a reaction temperature of 80° C. was not exceeded. The mixture was held at this temperature until an NCO content of 2% (based on the solid resin), determined according to DIN 53 185, was obtained.

Thereafter, 14.6 g 3-amino-propyltriethoxysilane and 16.2 g diethanolamine were added successively. The reaction mixture was held at 80° C. until free NCO groups could no longer be detected (titration). 12.6 g triethylamine were incorporated thoroughly, for neutralisation.

After adding the neutralised resin solution to 596 g of deionised water with vigorous stirring, a finely divided aqueous polyurethane dispersion was obtained.

PREPARATION EXAMPLE 2

339 g of a polyester of adipic acid, hexanediol and isophthalic acid (OH number: 104) and 19 g dimethylolpropionic acid were dissolved in 160 g N-methylpyrrolidone and heated to 40° C. Thereafter, 125 g isophorone diisocyanate were added in a manner such that a reaction temperature of 80° C. was not exceeded. The mixture was held at this temperature until an NCO content of 2% (based on the solid resin), determined according to DIN 53 185, was obtained. Thereafter, 43.8 g 3-amino-propyl-triethoxysilane and 2.3 g diethanolamine were added successively. The reaction mixture was held at 80° C. until free NCO groups could no longer be detected (titration). 12.6 g triethylamine were incorporated thoroughly, for neutralisation.

After adding 596 g deionised water over 5 minutes, a finely divided aqueous polyurethane dispersion was obtained.

PREPARATION EXAMPLE 3

339 g of a polyester of adipic acid, hexanediol and isophthalic acid (OH number: 104) and 19 g dimethylolpropionic acid were dissolved in 160 g N-methylpyrrolidone and heated to 40° C. Thereafter, 125 g isophorone diisocyanate were added in a manner such that a reaction temperature of 80° C. was not exceeded. The mixture was held at this temperature until an NCO content of 2% (based on the solid resin), determined according to DIN 53 185, was obtained. Thereafter, 42 g 3-amino-propyl-methyldiethoxysilane were added.

The reaction mixture was held at 80° C. until free NCO groups could no longer be detected (titration). 12.6 g triethylamine were incorporated thoroughly, for neutralisation. After adding 596 g deionised water over 5 minutes, a finely divided aqueous polyurethane dispersion was obtained.

PREPARATION EXAMPLE 4

339 g of a polyester of adipic acid, hexanediol and isophthalic acid (OH number: 104) and 19 g dimethylolpropionic acid were dissolved in 160 g N-methylpyrrolidone and heated to 40° C. Thereafter, 118.3 g trimethylhexamethylene diisocyanate were added in a manner such that a reaction temperature of 80° C. was not exceeded. The mixture was held at this temperature until an NCO content of 2% (based on the solid resin), determined according to DIN 53 185, was obtained.

Thereafter, 33.6 g 3-amino-propylmethyldiethoxysilane and 4.6 g diethanolamine were added successively. The reaction mixture was held at 80° C. until free NCO groups could no longer be detected (titration). After adding the resin to a mixture of 10.9 g N,N-dimethylisopropanolamine and 596 g deionised water with vigorous stirring, a finely divided aqueous polyurethane dispersion was obtained.

PREPARATION EXAMPLE 5

339 g of a polyester of adipic acid, hexanediol and isophthalic acid (OH number: 104) and 19 g dimethylolpropionic acid were dissolved in 160 g N-methylpyrrolidone and heated to 40° C. Thereafter, 125 g isophorone diisocyanate were added in a manner such that a reaction temperature of 80° C. was not exceeded. The mixture was held at this temperature until an NCO content of 2% (based on the solid resin), determined according to DIN 53 185, was obtained. Thereafter, 35.4 g 3-amino-propyl-dimethylethoxysilane were added.

The reaction mixture was held at 80° C. until free NCO groups could no longer be detected (titration). 14.5 g triethylamine were incorporated thoroughly, for neutralisation. After adding 596 g deionised water over 5 minutes, a finely divided aqueous polyurethane dispersion was obtained.

PREPARATION EXAMPLE 6

346 g of a polycaprolactone diol (OH number: 102) and 19 g dimethylolpropionic acid were dissolved in 160 g N-methylpyrrolidone and heated to 40° C. Thereafter, 138 g 1,3-bis(1-isocyanato-1-methylethyl)-benzene (TMXDI) were added in a manner such that a reaction temperature of 10 0° C. was not exceeded. The mixture was held at this temperature until an NCO content of 2% (based on the solid resin), determined according to DIN 53 185, was obtained. Thereafter, 43.8 g 3-amino-propyl-triethoxysilane and 2.3 g diethanolamine were added successively.

The reaction mixture was held at 80° C. until free NCO groups could no longer be detected (titration). 12.6 g triethylamine were incorporated thoroughly, for neutralisation.

After adding 622 g deionised water over 5 minutes, a finely divided aqueous polyurethane dispersion was obtained.

PREPARATION EXAMPLE 7 a)
Preparation of a Carboxy-Functional Polymer Containing Epoxide Groups 100 g of an anhydride mixture (Acid No./$H_2O$=486), prepared by the reaction of trimellitic anhydride with 1,2-propanediol, and thus consisting of trimellitic anhydride and anhydrides of the following formulae:

solvent was removed by distillation at 0.1 bar and 40° C. After filtration, a yellowish, practically clear, aqueous resin solution was obtained. Solids content: 32% (1 hour at 125° C.).

b)
Preparation of the Polymer Dispersion 705 g of the above aqueous (32%) dispersion and 196 g water were introduced into a reactor fitted with a stirrer, reflux condenser, internal thermometer and a meteting device for the monomers and for the initiator. This mixture was heated to 80° C. with stirring, and a solution of 0.5 g ammonium peroxydisulphate in 35 g water was added. Five minutes after the addition of the initiator, 35 g of a monomer mixture comprising 125 g methyl methacrylate, 94 g n-butyl acrylate and 17 g glycidyl methacrylate were added, and after a further 15 minutes of prepolymerisation the remaining amount of monomer was added over 2 hours. 10 minutes after the addition was complete, a further 0.2 g ammonium peroxydisulphate, dissolved in 10 g water, was added over 10 minutes, and the batch was stirred for a further 2 hours at 80° C. in order to effect complete reaction. A stable aqueous dispersion was obtained, which had a solids content of about 40%.

PREPARATION EXAMPLE 8 a)
Preparation of a Carboxy-Functional Polymer Containing Epoxide Groups 100 g of an anhydride mixture (Acid No./$H_2O$=560), prepared by the reaction of trimellitic anhydride with 1,2-

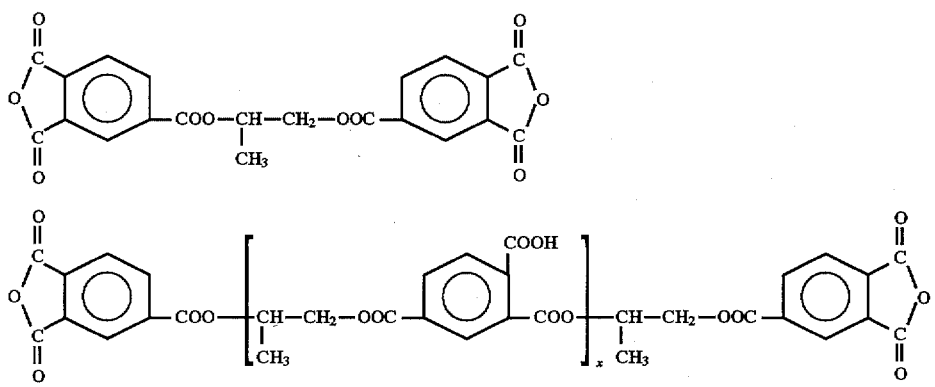

where x=1 to 8,
which had been homogenised in 108 g xylene at 50° C., were added drop-wise over 1 hour to a solution in 70 g methyl ethyl ketone of 141 g of a polyester (OH No.=88) which was prepared based on phthalic anhydride, isophthalic acid, maleic anhydride, propanol and glycefine as described in DE-OS 28 11 913. The reaction mixture was stirred at 90° C. until it had reached an acid number in water of 165 (100% resin). Thereafter, 12 g water were admixed, and an acid number in butanol of 168 (100% resin) was obtained after stirring for 6 hours at 80° to 90° C. The temperature of the mixture was reduced to 60° C., and after adding 0.3 g lithium benzoate, 132 g of an epoxidised linseed oil (epoxide number=8.7) were added drop-wise over 2 hours. The mixture was stirred until the acid number in butanol had decreased to 86.5. A mixture of 42 g dimethylamine (60% in water) in 860 g water was then stirred in. A light yellow, opalescent solution was obtained, from which the organic propanediol, which had been homogenised in 30 g acetone at 50° C., were added drop-wise over one hour to a solution of 127 g of a polyester (OH No.=107) in 70 g methyl ethyl ketone. The reaction mixture was stirred at 90° C. until it had reached an acid number in water of 197 (with respect to 100% resin). Thereafter, 15 g water were also admixed. After stirring for 6 hours at 80° to 90° C., the an acid number in butanol was 180 (100% resin). The temperature of the mixture was reduced to 60° C., and 133 g of an epoxidised linseed oil (epoxide number=8.9) were added drop-wise over 2 hours.

The mixture was stirred until the acid number in butanol had decreased to 90. Thereafter, a mixture of 56 g dimethylaminoethanol in 540 g water was stirred in. A light yellow, opalescent solution was obtained, from which the organic solvent was removed by distillation at 0.1 bar and 40° C. After filtration, a yellowish, practically clear, aqueous resin solution was obtained. Solids content: about 39% (1 hour at 125° C.).

b)

Preparation of the Polymer Dispersion 355 g of the (39%) aqueous dispersion from 8a) were mixed with 452 g water in a reactor fitted with a stirrer, reflux condenser, internal thermometer and metering devices for the monomers and for the initiator. The mixture was heated to 80° C. with stirring, and a solution of 0.5 g ammonium peroxydisulphate in 35 g water was added. Five minutes after the addition of the initiator, 35 g of a monomer mixture comprising 165 g methyl methacrylate, 142 g n-butyl acrylate and 24 g hydroxyethyl acrylate were added, and after a further 15 minutes of prepolymerisation the remaining amount of toohomer was added over 2 hours. 10 minutes after the addition was complete, a further 0.2 g ammonium peroxydisulphate, dissolved in 10 g water, was added over 10 minutes, and the batch was stirred for a further 2 hours at 80° C. in order to effect complete reaction. A stable aqueous dispersion was obtained, which had a solids content of about 40%.

PREPARATION EXAMPLE 9

Preparation of a Paste Resin 1395 g of a linear, saturated polyester (synthesised from adipic acid and hydroxypivalic acid neopentyl glycol ester) with an OH number of 112 and a viscosity (at 25° C.) of 8.7 Pas were heated to 90° C., with vigorous stirring, with 161 g dimethylolpropionic acid and 163 g trimethylolpropane, to effect dissolution in a reaction vessel fitted with an internal thermometer and a reflux condenser. After adding 865 g tetramethylxylylene diisocyanate, the mixture was slowly heated to 120° C. until the NCO content was less than 0.2%. Thereafter, the mixture was diluted with 861 g methoxypropanol.

| Solids (30 min 150° C.) | 75% by weight |
| acid number (with respect to solids) | 27 |
| viscosity at 25° C., diluted to 40% with methoxypropanol | 210 mPa · s* |

A mixture of 58.3 g dimethylethanolamine and 58.3 g water was rapidly added to 1963 g of this resin :olution and heated to 80° C. The mixture was then slowly diluted with water to form a turbid, highly viscous paste, which could readily be processed hot and which had the following characteristic properties:

| solids (30 min, 150° C.) | 32.3% by weight |
| viscosity at 25° C. | 1.3 Pas* |
| MEQ value | 42 |
| pH | 7.6 |

*measured in a rotating viscometer with a coaxial cylinder arrangement according to DIN 53 018 and DIN 53 019 after shearing for 5 minutes at a shear rate of 231 sec.$^{-1}$.

PREPARATION OF THE COMPONENTS FOR THE FOLLOWING LACQUER EXAMPLES

PREPARATION EXAMPLE 10

Preparation of a Binder Vehicle Solution 50.00 g of the water-thinnable binder vehicle described above in preparation example 7 were mixed with 43.94 g deionised water and 6.00 g butoxyethanol, and the pH was adjusted to 6.2–6.4 with 0.06 g N-dimethylaminoethanol.

PREPARATION EXAMPLE 11

Preparation of an Aluminium Paste 20.50 g of a commercially available aluminium paste with a metal content of 65% were well stirred with a mixture comprising 7.00 g butoxyethanol and 15.50 g deionised water, and then mixed with a mixture comprising 4.00 g of the binder vehicle described above in preparation example 7, and in addition with 4.50 g of the binder vehicle described above in preparation example 2, 10.00 g tutoxyethanol, 34.70 g deionised water, and 3.00g of a commercially available acidic acrylate thickener. The pH was adjusted to 6.2–6.4 with a mixture of 0.08 g N-dimethylaminoethanol and 0.72 g deionised water.

PREPARATION EXAMPLE 12

Preparation of a Blue Pigment Paste

Using a dissolver, 10.00g

Cu phthalocyanine pigment were pre-dispersed in 17.00 g of a commercially available hexamethoxymelamine resin and 10.00 g butoxyethanol, and after adding a further 5.00 g of the melamine resin and 10.00 g butoxyethanol, the mixture was fully dispersed in a bead mill, followed by mixing with a mixture of 0.90g of a commercially available acidic acrylate thickener and 18.91 g deionised water. The pH was adjusted to 7.1–7.3 with 2.00 g N-dimethylaminoethanol and 26.19 g deionised water.

PREPARATION EXAMPLE 13

Preparation of a Green Pigment Paste 20.00 g of a chlorinated phthalocyanine pigment were pre-dispersed, in a dissolver, in a mixture comprising 20.00 g of the binder vehicle described above in preparation example 9, 35.00 g butoxyethanol and 0.50 g N-dimethylaminoethanol, and were subsequently fully dispersed in a bead mill. Thereafter, the mixture was diluted with 24.50 g
deionised water.

PREPARATION EXAMPLE 14

The procedure was as described in preparation example 10, except that the binder vehicle described in preparation example 8 was used (50.00 g).

PREPARATION EXAMPLE 15

The procedure was as described in preparation example 11, except that the binder vehicle described in preparation example 8 was used (4.00 g), together with the binder vehicle described in preparation example 2 (4.50 g).

EXAMPLES OF LACQUER FORMULATIONS

EXAMPLE 1

1.1 Production of a Water-Thinnable, Blue Metallic Base Lacquer 30.00 g
of the binder vehicle solution described in preparation example 10 were stirred for a period of 30 minutes with
19.00 g
of the ahminium paste described in preparation example 11,
1.90 g
acidic acrylate thickener (as used previously),
17.44 g
deionised water, and
0.25 g
N-dimethylaminoethanol.
25.50 g
of the polyurethane dispersion described in preparation example 6 were stirred into this mixture and the pigment paste described in preparation example 12 was added in an amount of
0.94 g.
4.00 g
n-butanol was then added with stirring, and the viscosity was adjusted to 90–95 mPa·s at a shear rate of 100 sec$^{-1}$ with
0.96 g
water.

Solids content: 18.0% by weight (120 minutes in a circulating air drying oven at 120° C.).

1.2 Application of the Base Lacquer and of a Clear Lacquer

The base lacquer described in 1.1. was applied using a compressed air atomising spray gun to a steel sheet, which was pre-coated in the usual manner with a Zn phosphate coating, electrodip lacquer and spray primer, so that a total dry coat thickness of 15 μm was obtained by the application of two coats. The conditions for the application of the base lacquer were 23° C. ambient temperature and 60% relative atmospheric humidity. After application, the coated steel sheet was force-dried for 5 minutes at 50° C. in a circulating air drying oven, and after cooling to 23° C. was overpainted in the usual manner with a commerciaily available acrylate-melamine resin clear lacquer and stoved for 30 minutes at 130° C.

A uniform, flaw-free coating was obtained in this manner, which exhibited an excellent metallic effect, very high gloss and outstanding resistance to water of condensation.

EXAMPLE 2

2.1 Production of a Water-Thinnable, Silver Metallic Base Lacquer

A silver metalic base lacquer was produced, analogously to example 1.1, from
40.00 g
of the binder vehicle solution described in preparation example 14, 9.00 g
of the aiuminium paste described in preparation example 15,
1.90 g
acidic acrylate thickener,
0.26 g
N-dimethylaminoethanol,
22.00 g
polyurethane dispersion (as in preparation example 2),
4.00g
n-butanol, and
12.84 g
deionised water.

The solids content was 18.0% by weight (120 minutes in a circulating air drying oven at 120° C.). The viscosity was 90–95 mPa·s at a shear rate of 100 sec$^{-1}$.

2.2 Application of the Base Lacquer and of a Clear Lacquer

A pre-eoated steel sheet was coated, as described in example 1.2, with base lacquer and force-dried for 5 minutes at 50° C. in a circulating air drying oven. After cooling, the base lacquer was overpainted with a commercially available two-component acrylate-isocyanate clear lacquer and stoved for 30 minutes at 130° C.

The coating obtained in this manner was characterised by high gloss, an absolutely uniform, flaw-free effect formation, a pronounced metallic effect and outstanding resistance to water of condensation.

EXAMPLE 3

3.1 Production of a Water-Thinnable, Green Metallic Base Lacquer

The base lacquer was produced, analogously to example 1.1, from
59.00 g
of the binder vehicle solution as in preparation example 10,
18.50 g
of aluminium paste as in preparation example 11,
1.90 g
acidic acrylate thickener,
0.26 g
N-dimethylaminoethanol,
4.80 g
polyurethane dispersion as in preparation example 4,
0.60g
of the green pigment paste described in preparation example 13,
4.00 g
n-butanol, and
10.94 g
oeionised water.

Solids content:
17.1% by weight (120 minutes in a circulating air drying oven at 120° C.).

Viscosity:
90–95 mPa·s at a shear rate of 100 sec$^{-1}$.

3.2 Application of the Base Lacquer and of a Clear Lacquer

As described in example 1.2, the base lacquer from 3.1 was applied to a pre-coated steel sheet and, after force-drying, was overpainted with a commercially available acrylate-melamine clear lacquer and stored for 30 minutes at 130° C. A green metallic coating was obtained, the property spectrum of which was equally as good as those of examples 1.2 and 2.2.

EXAMPLE 4

4.1 Production of a Single-Colour, Red Base Lacquer 300 g of a customary paste resin (as in the example of DE-OS 4 000 889) was mixed with 350 g of a commercially available vat pigment (colour index Red 168). The pH was adjusted to 8.5 with dimethylethanolamine, and the solids content was adjusted to 50% by weight by adding deionised water. The mixture was then fully dispersed in a bead mill until transparent.

4.2

1.4 g of a commercially available thickener based on polyacrylic acid (solids content: 10% by weight; pH 7.5) were mixed with 129 g of the dispersion from example 1 and 40 g of the paste resin from example 4.1. 24 g of a commercially available, water-insoluble melamine resin (Setamine US 138/BB 70 manufactured by AKZO) were then added with stirring. 10 g of the red paste from example 4.1 were then added and homogeneously stirred in. The viscosity was adjusted to an application viscosity of 100–130 mPa·s using deionised water; this was measured in a rotating viscometer at 25° C. and at a shear rate of 231 sec$^{-1}$.

4.3 Application of the Base Lacquer and of a Clear Lacquer

The aqueous base lacquer obtained was applied by spraying to a customary bodywork panel which had been phosphated and pre-coated by cathodic immersion coating and with filler. This was effected to give a dry coat thickness of 30 μm. After the application, the coating was ventilated with air for 10 minutes at room temperature and then pre-dried for 10 minutes at 80° C. A commercially available, melamine resin hardening automobile production clear lacquer based on an acrylate resin was then overpainted to give a dry coat thickness of 35 μm and dried for 18 minutes at 120° C. (workpiece temperature).

A multilayer coating was obtained which exhibited outstanding resistance to water of condensation (DIN 50 017, 240 hours, 40° C.).

EXAMPLE 5

Production of a Silver-Metallic Double-Layer Coating 20 g of a commercially available aluminium paste suitable for aqueous base lacquer, containing 65% by weight of aluminum, 20 g butyl glycol, 6 g N-methylpyrrolidone and 1 g of a commercially available surface-active agent were mixed together to form a bronze dispersion. Thereafter, 1.4 g of a commercially available thickener based on polyacrylic acid (solids content: 10% by weight; pH 7.5) were mixed in. 129 of the dispersion from example 1 and 40 g of the paste resin from example 4.1 were then stirred into the bronze dispersion.

24 g of a commercially available, water-insoluble melamine resin (Setamine US 138/BB 70 manufactured by Akzo) were then added with stirring. The viscosity was adjusted to an application viscosity of 100–130 mPa·s using deionised water; this was measured in a rotating viscometer at 25° C. and at a shear rate of 231 sec$^{-1}$.

The aqueous base lacquer obtained was applied by spraying to a customary bodywork panel which had been phosphated and pre-coated by cathodic immersion coating and with filler. This was effected to give a dry coat thickness of 15 μm. After the application, the coating was ventilated with air for 10 minutes at room temperature and then pre-dried for 10 minutes at 80° C. A commercially available, melamine resin hardening automobile production clear lacquer based on an acrylate resin was then overpainted to give a dry coat thickness of 35 μm and dried for 18 minutes at 120° C. (workpiece temperature).

A multilayer coating was obtained which exhibited outstanding resistance to water of condensation.

We claim:

1. A process for producing a decorative multilayer coating on a substrate, comprising: applying an aqueous self-crosslinking coating medium as a color and/or effect-inparting base lacquer to the substrate; and overpainting with a transparent lacquer coat, wherein the aqueous, self-crosslinking coating medium contains, as a binder vehicle, an aqueous dispersion of a polyurethane resin of linear or branched structure having a number average molecular weight (Mn) of 2500 to 120,000, a content per 100 g solid resin, of 10 to 400 mmole of lateral and/or terminal hydroxyl and/or R'O groups bonded to silicon, the R' group being [=] a $C_1$ to $C_8$ alkyl or C(O)R''', and the R''' group being [=] a $C_1$ to $C_{10}$ alkyl, a hydroxyl number of 0 to 150 mg KOH/g with respect to the solid resin, wherein hydroxyl groups bonded to silicon are not included in the calculation of the OH number, and a content of anionc groups and/or groups convertible into anionic groups of 5 to 200 mEq per 100 g solid resin and more than a ten-fold stoichiometric excess of water, relative to the hydroxyl and/or R'O groups bonded to silicon, is used to make the aqueous medium.

2. An aqueous, self-crosslinking base lacquer coating medium comprising: coloured and/or effect pigments suitable for the production of a base lacquer coat of a decorative multilayer coating and, as a binder vehicle, an aqueous dispersion of a polyurethane resin of linear or branched structure having a number average molecular weight (Mn) of 2500 to 120,000, a content, per 100 g solid resin of 10 to 400 mmole of lateral and/or terminal hydroxyl and/or R'O groups bonded to silicon, the R' group being [=] a $C_1$ to $C_8$ alkyl or C(O)R''', and the R''' group being [=] a $C_1$ to $C_{10}$ alkyl, a hydroxyl number of 0 to 150 mg KOH/g with respect to the solid resin, wherein hydroxyl groups bonded to silicon are not included in the calculation of the OH number, and a content of anionic groups and/or groups convertible into anionic groups of 5 to 200 mEq per 100 g solid resin and more than a ten-fold stoichiometric excess of water, relative to the hydroxyl and/or R'O groups bonded to silicon is used to make the aqueous medium.

3. A process according to claim 1, wherein the polyurethane resin has a content of 20 to 300 mmole of lateral and/or terminal hydroxyl and/or R'O groups bonded to silicon.

4. A process according to claim 1, wherein the polyurethane resin is obtained by reacting a linear or branched, non-gelled polyurethane prepolymer, which contains anionic groups and/or groups capable of forming anionic groups and which is isocyanate-functional, with one or more compounds of general formula

$$((H-X-)_nR)_aSi(OR')_b(R'')_c \qquad (I)$$

where

X

[=] is O, S, NH or NR$^{IV}$,

R

[=] is bifunctional, trifunctional or tetrafunctional organic radical with a molecular weight of 13 to 500,

R'

[=] is $C_1$ to $C_8$ alkyl or $C(O)R'''$,

R"

[=] and R''' [=] each independently are a $C_1$ to $C_{10}$ alkyl, $R^{IV}$

[=] is a $C_1$ to $C_8$ alkyl, a

[=] is 1, 2or3, b

[=]
is 1, 2or 3, c

[=] is 0, 1 or 2, n

[=] is 1, 2, 3, provided that a, b and c are chosen so that the sum of a plus b plus c is four.

5. A process according to claim 4, wherein the isocyanate-functional polyurethane prepolymer is obtained by a reaction in an anhydrous medium of a) at least one linear or branched compound which contains at least two groups which react with isocyanate and which has an average molecular weight of 60 to 10,000, b) at least one organic polyisocyanate, c) at least one compound containing more than one group which reacts with isocyanate and at least one anionic group and/or a group capable of forming an anionic group, with a number average molecular weight (Mn) up to 10,000, at an NCO/OH ratio of greater than 1 to 4:1.

6. A process according to claim 5, wherein the linear or branched compound of component a) is at least one polyol comprising one or more polyethers, polyesters, polyurethanes and/or polycarbonates, each containing at least two OH groups in its molecule and having a number average molecular weight (Mn) of 600–10,000.

7. A process according to claim 1, wherein the aqueous coating medium for the base lacquer coat contains one or more binder vehicles in an amount of up to 75% by weight with respect to the total resin solids.

8. A coating medium according to claim 2, wherein the aqueous self-crosslinking base lacquer coating medium has a solids content of 10 to 50% by weight and a ratio of pigment to binder vehicle of 0.03:1 to 3:1, with respect to the weight of solids.

9. A process according to claim 1, wherein the aqueous base lacquer coat is applied to provide a dry coat thickness of 8 to 50 µm, is air ventilated, is overpainted wet-on-wet with a clear lacquer to provide a dry coat thickness of 30–60 µm, and is crosslinked jointly with the latter at 20° to 150° C.

10. A process according to claim 1, wherein the substrate is a motor vehicle.

11. A coating medium according to claim 2, wherein the aqueous dispersion of a polyurethane resin is obtained by reacting a linear or branched, non-gelled polyurethane prepolymer, which contains anionic groups and/or groups capable of forming anionic groups and which is isocyanate-functional, with one or more compounds of general formula $$((H-X-)_n R)_a Si(OR')_b (R'')_c \quad (I)$$

where

X is O, S, NH or $NR^{IV}$,

R is bifunctional, trifunctional or tetrafunctional organic radical with a molecular weight of 13 to 500, R' is $C_1$ to $C_8$ alkyl or $C(O)R'''$, R" and R''' each independently are a $C_1$ to $C_{10}$ alkyl, $R^{IV}$ is $C_1$ to $C_8$ alkyl, a is 1, 2 or 3, b is 1, 2 or 3, c is 0, 1 or 2, n is 1, 2, 3, provided that a, b and c are chosen so that the sum of a plus b plus c is four, to form a reaction product;

and converting the reaction product into an aqueous dispersion by mixing with water using a more than tenfold stoichiometric excess of the amount of water necessary for the hydrolysis of the R'OSi groups.

12. A process according to claim 4 further comprising admixing one or more alkanolamines containing $NH_2$ and/or NH groups with an OH functionality of at least 1 with the compounds of general formula $((H-X-)_n R)_a Si(OR')_b (R'')_c$ before reacting the compounds with the polyurethane prepolymer.

13. A process according to claim 4 further comprising reacting the reaction product with one or more alkanolamines containing $NH_2$ and/or NH groups with an OH functionality of at least 1, the reaction product containing at least a few isocyanate groups.

14. A process according to claim 6 which component a) is a mixture of at least one polyol and one or more at least difunctioanl low molecular weight alcohols and/or amines and/or amino alcohols which differ in formula from the polyol and have a molecular weight of less than 600.

15. A process according to claim 14 wherein the molecular weight is less than 400.

16. A coating medium according to claim 8 wherein crosslinking agent and paste resin are included in the aqueous self-crosslinking base lacquer coating medium, the weights of the crosslinking agent and paste resin are summed with the weight of the binder vehicle, and that sum is substituted for the weight of the binder vehicle in the calculation of the ratio.

* * * * *